US010091037B2

(12) United States Patent
Xiong et al.

(10) Patent No.: US 10,091,037 B2
(45) Date of Patent: Oct. 2, 2018

(54) DPD SYSTEM

(71) Applicant: Datang Mobile Communications Equipment Co., Ltd., Beijing (CN)

(72) Inventors: Jun Xiong, Beijing (CN); Peng Xiao, Beijing (CN); Jieli Wang, Beijing (CN); Tao Duan, Beijing (CN)

(73) Assignee: Datang Mobile Communications Equipment Co., Ltd. (CN)

( * ) Notice: Subject to any disclaimer, the term of this patent is extended or adjusted under 35 U.S.C. 154(b) by 0 days.

(21) Appl. No.: 15/738,799

(22) PCT Filed: Jun. 16, 2016

(86) PCT No.: PCT/CN2016/086030
§ 371 (c)(1),
(2) Date: Dec. 21, 2017

(87) PCT Pub. No.: WO2016/206563
PCT Pub. Date: Dec. 29, 2016

(65) Prior Publication Data
US 2018/0191537 A1    Jul. 5, 2018

(30) Foreign Application Priority Data

Jun. 23, 2015   (CN) .......................... 2015 1 0350367

(51) Int. Cl.
*H04L 27/00* (2006.01)
*H04L 25/49* (2006.01)
(Continued)

(52) U.S. Cl.
CPC ......... *H04L 25/4927* (2013.01); *H04B 1/005* (2013.01); *H04B 1/0475* (2013.01); *H04L 25/03343* (2013.01); *H04B 1/62* (2013.01)

(58) Field of Classification Search
USPC .......... 375/219, 220, 221, 222, 240, 240.26, 375/240.27, 254, 259, 284, 285, 278, 295,
(Continued)

(56) References Cited

U.S. PATENT DOCUMENTS

| 7,890,562 B2 * | 2/2011 | Gross .................... G06F 1/0328 708/276 |
| 7,933,942 B2 * | 4/2011 | McDonald ............ G06F 1/0328 708/276 |

(Continued)

FOREIGN PATENT DOCUMENTS

| CN | 101355536 A | 1/2009 |
| CN | 101635697 A | 1/2010 |

(Continued)

OTHER PUBLICATIONS

A. Cidronali et al., "A New Approach for Concurrent Dual-Band IF Digital PreDistortion: System Design and Analysis," IEEEE, Dec. 31, 2008.

(Continued)

*Primary Examiner* — Linda Wong
(74) *Attorney, Agent, or Firm* — DLA Piper LLP (US)

(57) ABSTRACT

Disclosed is a DPD system. A DPD system provided in an embodiment of the present invention includes a table look-up unit and a DPD processing unit. First to Nth look-up-tables are used to combine two bit sequences of bit sequences obtained according to first to fourth address conversion tables so as to obtain first to Nth table look-up addresses. First to Nth DPD coefficients are found according to the first to Nth table look-up addresses, and one DPD coefficient is obtained via a DPD coefficient combination module, such that the DPD processing unit can perform DPD processing on a signal in first band according to the DPD coefficient. In the embodiment of the present invention, a look-up address is obtained according to four address (Continued)

conversion tables, a DPD coefficient is obtained from a look-up-table according to the look-up address, and then a final DPD coefficient is obtained to perform signal processing. Thereby, a look-up address generation solution is provided for a multi-band DPD system to realize multi-band DPD processing.

11 Claims, 7 Drawing Sheets

(51) Int. Cl.
　　*H04L 25/03*　　(2006.01)
　　*H04B 1/00*　　(2006.01)
　　*H04B 1/04*　　(2006.01)
　　*H04B 1/62*　　(2006.01)
(58) Field of Classification Search
　　USPC ........ 375/296, 299, 316, 324, 340, 346, 347
　　See application file for complete search history.

(56) References Cited

U.S. PATENT DOCUMENTS

| | | | | |
|---|---|---|---|---|
| 8,004,358 | B2* | 8/2011 | Lozhkin | H03F 1/3247 330/149 |
| 8,831,135 | B2* | 9/2014 | Utsunomiya | H04L 27/368 375/296 |
| 9,450,544 | B2* | 9/2016 | Chang | H03F 3/19 |
| 9,584,167 | B2* | 2/2017 | Kakinuma | H04B 1/0475 |
| 2002/0024398 | A1* | 2/2002 | Lagerblom | H04L 27/2071 332/103 |
| 2002/0044014 | A1* | 4/2002 | Wright | H03F 1/3241 330/2 |
| 2002/0079965 | A1* | 6/2002 | Maniwa | H03F 1/3258 330/149 |
| 2002/0110211 | A1* | 8/2002 | Bockelman | G06F 1/022 375/371 |
| 2004/0047432 | A1* | 3/2004 | Iwasaki | H03F 1/3294 375/297 |
| 2006/0029155 | A1* | 2/2006 | Shako | H03F 1/3247 375/296 |
| 2007/0296495 | A1* | 12/2007 | Shako | H03F 1/3247 330/149 |
| 2008/0074186 | A1* | 3/2008 | Sihlbom | H03F 1/3247 330/149 |
| 2008/0109504 | A1* | 5/2008 | McDonald | G06F 1/022 708/275 |
| 2008/0130785 | A1* | 6/2008 | Reinhardt | H03F 1/3241 375/296 |
| 2009/0111399 | A1* | 4/2009 | Norris | H03F 1/3247 455/114.3 |
| 2010/0001795 | A1 | 1/2010 | Shi et al. | |
| 2010/0156471 | A1* | 6/2010 | Roger | H03F 1/3211 327/103 |
| 2010/0289573 | A1* | 11/2010 | Brown | H03F 1/3247 330/149 |
| 2010/0311360 | A1* | 12/2010 | Huang | H03F 1/3241 455/114.3 |
| 2012/0202440 | A1* | 8/2012 | Fudaba | H03F 1/3247 455/114.2 |
| 2012/0275545 | A1* | 11/2012 | Utsunomiya | H04L 27/368 375/297 |
| 2013/0015917 | A1* | 1/2013 | Ishikawa | H03F 1/3247 330/149 |
| 2013/0099949 | A1* | 4/2013 | Wagner | H03M 3/368 341/143 |
| 2013/0223565 | A1* | 8/2013 | McCallister | H04L 25/03343 375/297 |
| 2013/0315291 | A1* | 11/2013 | Kim | H03F 1/3247 375/232 |
| 2014/0003554 | A1* | 1/2014 | Matsubara | H04B 1/0475 375/297 |
| 2014/0072074 | A1* | 3/2014 | Utsunomiya | H04L 25/03343 375/296 |
| 2015/0015328 | A1* | 1/2015 | Chang | H03F 1/3258 330/149 |
| 2015/0077179 | A1* | 3/2015 | Matsubara | H03F 3/24 330/149 |
| 2015/0077180 | A1* | 3/2015 | Matsubara | H04B 1/0475 330/149 |
| 2015/0280947 | A1* | 10/2015 | Matsubara | H04L 25/08 375/297 |
| 2015/0304068 | A1* | 10/2015 | Xiong | H04L 25/03159 375/267 |
| 2016/0242149 | A1* | 8/2016 | Batra | H04J 13/16 |

FOREIGN PATENT DOCUMENTS

| | | |
|---|---|---|
| CN | 101826887 A | 9/2010 |
| CN | 102014090 A | 4/2011 |
| CN | 102118334 A | 7/2011 |
| CN | 102255835 A | 11/2011 |
| CN | 105024960 A | 11/2015 |
| WO | 2013/165288 A1 | 11/2013 |

OTHER PUBLICATIONS

Haixia Xiang, "Research on Concurrent Dual-Band Digital Predistortion Technology in Mobile Communication," Chinese Master's Theses full-text Database Information Science and Technology, No. 4, Apr. 15, 2015.

Supplementary European Search Report dated Jun. 7, 2018, of corresponding European Application No. 16813679.4.

Quindroit, C., et al., "FPGA Implementation of Orthogonal 2D Digital Predistortion System for Concurrent Dual-Band Power Amplifiers Based on Time-Division Multiplexing," *IEEE Transactions on Microwave Theory and Techniques*, vol. 61, No. 12, Dec. 1, 2013, pp. 4591-4599.

Naraharisetti, N., et al., "Efficient Least-Squares 2-D-Cubic Spline for Concurrent Dual-Band Systems," *IEEE Transactions on Microwave Theory and Techniques*, vol. 63, No. 7, Jun. 12, 2015, pp. 2199-2210.

* cited by examiner

DPD SYSTEM

CROSS REFERENCE TO RELATED APPLICATION

This application is a National Stage of International Application No. PCT/CN2016/086030, filed Jun. 16, 2016, which claims priority to Chinese Patent Application No. 201510350367.0, titled 'a DPD system', filed with the Chinese Patent Office on Jun. 23, 2015, both of which are hereby incorporated by reference in their entireties.

FIELD

The present disclosure relates to the field of communication technology, and particularly to a DPD system.

BACKGROUND

In existing Digital PreDistortion (DPD) technology, the information distribution of the DPD look-up-table (LUT) is uniform quantization distribution, thus uniform quantization technology is usually used to look up an LUT address.

For a DPD system based on memory polynomial model, a math model for predistortion processing on a signal is:

$$z(n) = \sum_{m=0}^{M} x(n-m) \sum_{q=1}^{Q} w_{m,q} |x(n-m)|^{(q-1)} \qquad (1)$$

$$= \sum_{m=0}^{M} x(n-m) \cdot LUT_m(|x(n-m)|)$$

$$= \sum_{m=0}^{M} x(n-m) \cdot LUT_m(|Q(r_{n,m})|).$$

The expression of $LUT_m(|x(n-m)|)$ in formula (1) is:

$$LUT_m(|x(n-m)|) = \sum_{q=1}^{Q} W_{m,q} |x(n-m)|^{(q-1)}, \qquad (2)$$

$$m = 1 \ldots M, n = 1 \ldots N.$$

In formula (1), $r_{n,m} = |x(n-m)|$ stands for the amplitude of input signal, while $Q(\bullet)$ is the quantization factor. In formula (2), $w_{m,q}$, $m=1 \ldots M$, $q=1 \ldots Q$ is a DPD coefficient obtained through DPD adaptive filter calculation.

Thus we can see, an input address of the LUT is decided on the basis of quantized amplitude $Q(r_{n,m})$ of the input signal, that is, amplitude $|x(n-m)|$ of the input signal is used as an index when looking up in the LUT to get the DPD coefficient, where the DPD coefficient is represented as $LUT_m(|x(n-m)|)$ in formula (1). Correspondingly, when updating the DPD coefficient, the DPD coefficient is saved with the amplitude $|x(n-m)|$ as the index.

However, the prior art is generally applicable to a single-band DPD system. Single-band system is designed exclusively for a certain band, and a single-band LUT address is obtained by directly truncating the signal amplitude, thus unsuitable for a multi-band DPD system.

SUMMARY

Embodiments of the disclosure provide a DPD system, configured to generate a table look-up address applicable to multi-band to realize multi-band DPD processing.

A DPD system according to embodiments of the present disclosure, the DPD system including: a table look-up unit and a DPD processing unit, where the table look-up unit includes first to fourth address conversion tables, first to Nth look-up-tables and a DPD coefficient combination module; where the first to Nth look-up tables are multi-band look-up tables, N=2M, M is record length and a positive integer; the first address conversion table is configured to obtain a corresponding first bit sequence of second length according to a bit sequence of first length corresponding to amplitude of first signal at first band, where the first length is longer than the second length; the second address conversion table is configured to obtain a corresponding second bit sequence of the second length, according to a bit sequence of the first length corresponding to amplitude of first signal at second band; the third address conversion table is configured to obtain a corresponding third bit sequence of the second length according to a bit sequence of the first length corresponding to amplitude of second signal at the first band, where the second signal at the first band is obtained by delaying the first signal at the first band; the fourth address conversion table is configured to obtain a corresponding fourth bit sequence of the second length according to a bit sequence of the first length corresponding to amplitude of second signal at the second band, where the second signal at the second band is obtained by delaying the first signal at the second band; the ith look-up-table of the first to Nth look-up-tables, is configured to obtain the ith table look-up address by combining a bit sequence of the second length corresponding to a signal at the first band and a bit sequence of second length corresponding to a signal at the second band, and to look up the ith DPD coefficient according to the ith table look-up address, where $1 \leq i \leq N$; the DPD coefficient combination module is configured to obtain a DPD coefficient by processing the first to the Nth DPD coefficients; and the DPD processing unit is configured to perform DPD processing on signals at the first frequency according to the DPD coefficient obtained by the DPD coefficient combination module.

Preferably, M=1; the first look-up-table is configured to look up the first DPD coefficient according to a first table look-up address constituted by the first bit sequence and the second bit sequence, where in an order of bits from high to low, the first table look-up address includes the first bit sequence and the second bit sequence; and the second look-up-table is configured to look up a second DPD coefficient according to the second table look-up address constituted by the third bit sequence and the fourth bit sequence; where in an order of bits from high to low, the second table look-up address includes the third bit sequence and the fourth bit sequence.

Preferably, M=2; the first look-up-table is configured to look up a first DPD coefficient according to the first table look-up address constituted by the first bit sequence and the second bit sequence, where in an order of bits from high to low, the first table look-up address includes the first bit sequence and the second bit sequence; the second table look-up-table is specifically configured to look up a second DPD coefficient according to the second table look-up address constituted by the first bit sequence and the second bit sequence, where in an order of bits from high to low, the second look-up address includes the first bit sequence and the second bit sequence; the third look-up-table is configured to look up a third DPD coefficient according to the third table look-up address constituted by the third bit sequence and the fourth bit sequence, where in an order of bits from high to low, the third table look-up address includes the third bit sequence and the fourth bit sequence; and the fourth look-up-table is configured to look up a fourth DPD coefficient according to the fourth table look-up address constituted by the third bit sequence and the fourth bit sequence, where in an order of bits from high to low, the fourth table look-up address includes the third bit sequence and the fourth bit sequence.

Preferably, the DPD system also includes a bit truncation unit, where the bit truncation unit is configured to truncate the bit sequences of the amplitudes of the first signal at the first band, the second signal at the first band, the first signal at the second band and the second signal at the second band, to obtain the bit sequences of the first length corresponding to the amplitudes of the first signal of the first band, the second signal of the first band, the first signal of the second band and the second signal of the second band.

Preferably, the bit truncation unit is configured to cut off the highest bit and the lowest three bits in the bit sequence of amplitude of each of the first signal at the first band, the second signal at the first band, the first signal at the second band and the second signal at the second band, to obtain bit sequences of the first length corresponding to the amplitudes of the first signal of the first band, the second signal of the first band, the first signal of the second band and the second signal of the second band, where a bit sequence of the first length includes 11 bits.

Preferably, a first switch and a second switch are respectively set at the input end of first band signals and the input end of second band signals of the table look-up unit, where the first switch selectively connects with a first contact and a second contact, and the second switch selectively connects with a third contact and a fourth contact; when the first switch connects with the first contact, the first band signals are input into a single-band look-up-table of the first band; and when the first switch connects with the second contact, the first band signals are input into the first address conversion table and the second address conversion table; and when the second switch connects with the third contact, the second band signals are input into a signal-band look-up-table of the second band; and when the second switch connects with the fourth contact, the second band signals are input into the third address conversion table and the fourth address conversion table.

Preferably, the control module is configured to if it is determined that the input signal is a single-band signal at the first band, control the first switch to connect with the first contact; if it is determined that the input signal is a second-band signal at the second band, control the second switch to connect with the third contact; and if it is determined that the input signal is a multi-band signal, control the first switch to connect with the second contact and the second switch to connect with the fourth contact.

Preferably, the first to the fourth address conversion tables each include a corresponding relationship between a bit sequence of the first length and a bit sequence of the second length, where, the range of values of the bit sequence of the first length is divided into first to Eth sub-ranges of an equal size, the range of values of the bit sequence of the second length is divided into first to Eth sub-ranges of different sizes; and a jth sub-range of the range of values of the bit sequence of the first length is corresponding to the jth sub-range of the range of values of the bit sequence of the second length in a one-to-one match, where multiple bit sequences in the bit sequences of the first length correspond to one bit sequence in the bit sequences of the second length E is an integer greater than 1 and 1≤j≤E; or the range of values of the bit sequence of the first length is divided into first to Eth sub-ranges of different sizes, the range of values of the bit sequence of the second length is divided into first to Eth sub-ranges of an equal size; and a jth sub-range of the range of values of the bit sequence of the first length is corresponding to the jth sub-range of the range of values of the bit sequence of the second length in a one-to-one match, where multiple bit sequences in the bit sequences of the first length correspond to one bit sequence in the bit sequences of the second length, E is an integer greater than 1 and 1≤j≤E.

Preferably, E=3; if the range of values of a bit sequence of the second length is divided into first to third sub-ranges of an equal size in an order of the bit sequence's value from small to large, the second sub-range is the smallest; and if the range of values of a bit sequence of the first length is divided into first to third sub-ranges in an order of the bit sequence's value from small to large, the second sub-range is the largest.

Preferably, each of the first to the Nth look-up-tables includes 64×64 DPD coefficients at most, where the second length is 6 bits and each of the first to the Nth table look-up addresses obtained after combination includes 12 bits.

Preferably, the first band is the F band, and the second band is the A band; or the first band is the A band and the second band is the F band.

The DPD system according to the embodiments of the present disclosure includes a table look-up unit and a DPD processing unit, where the table look-up unit includes first to fourth address conversion tables, first to Nth look-up-tables and a DPD coefficient combination module, where N=2M and M is record length. The first to the fourth address conversion tables obtain bit sequences of fewer bits according to bit sequences corresponding to amplitudes of signals at different bands, respectively; each of the first to the Nth look-up-tables obtains one of the first to Nth table look-up addresses by combining two bit sequences of the bit sequences obtained according to the first to the fourth address conversion tables, and looks up one of first to Nth DPD coefficients according to one of the first to the Nth table look-up addresses; the DPD coefficient combination module processes the first to the Nth DPD coefficients to obtain a DPD coefficient, so that the DPD processing unit could perform DPD processing on first band signals according to the DPD coefficient obtained by the DPD coefficient processing module. As according to the embodiments of the present disclosure, N look-up addresses are obtained according to four address conversion tables, then N DPD coefficients in look-up-tables are obtained according to the N look-up addresses and a final DPD coefficients is obtained according to the N DPD coefficients to process signals, therefore a look-up address generation solution is provided for a multi-band DPD system to realize multi-band DPD processing.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

To make the purposes, technical solutions and advantages of the present disclosure clearer, embodiments of the present disclosure will now be described with reference to the accompanying drawings, and obviously the embodiments described are only part of the embodiments of the present disclosure, not all the embodiments. Based on the embodiments of the present disclosure, all the other embodiments obtained by those of ordinary skill in the art without making creative work are within the scope of the present disclosure.

Figure 1:
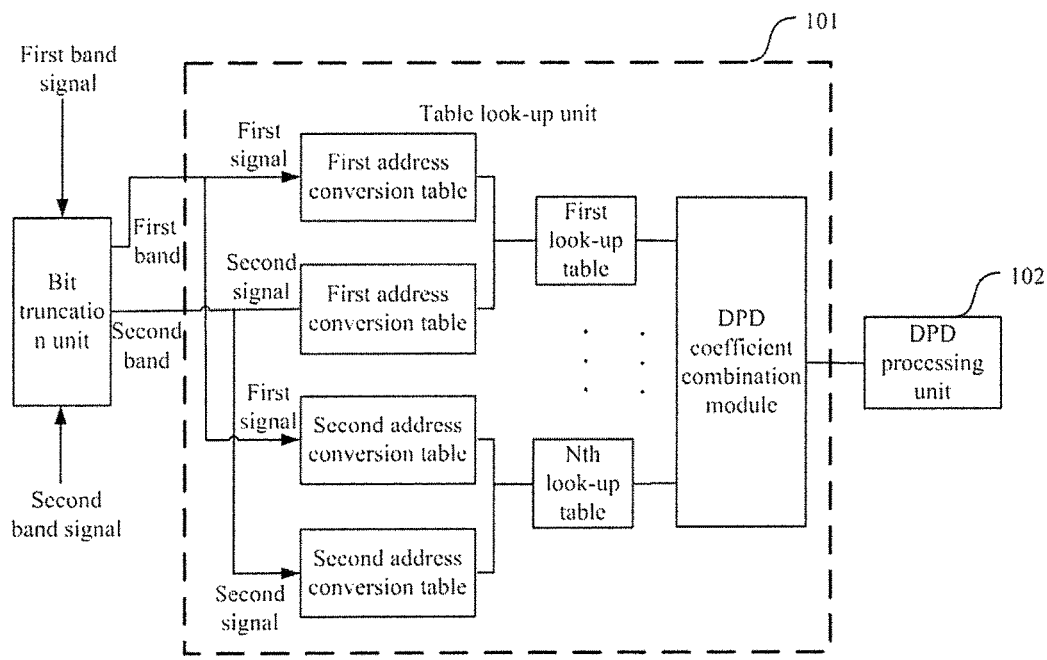
FIG. 1 is a schematic diagram of the structure of a DPD system according to embodiments of the disclosure.

FIG. 1 is a schematic diagram of the structure of a DPD system according to embodiments of the present disclosure, where the system includes a table look-up unit 101 and a DPD processing unit 102, and the table look-up unit 101 includes: first to fourth address conversion tables, first to Nth look-up-tables and a DPD coefficient combination module, where the first to Nth look-up-tables are multi-band look-up-tables, N=2M, M is record length and is a positive integer.

Functions of each module are described below, respectively.

The first address conversion table is configured to obtain a corresponding first bit sequence of second length according to a bit sequence of first length corresponding to amplitude of first signal at first band, where the first length is greater than the second length.

The second address conversion table is configured to obtain a corresponding second bit sequence of the second length according to a bit sequence of the first length corresponding to amplitude of first signal at second band.

The third address conversion table is configured to obtain a corresponding third bit sequence of the second length according to a bit sequence of a first length corresponding to amplitude of second signal at the first band, where the second signal at the first band is obtained by delaying the first signal at the first band.

The fourth address conversion table is configured to obtain a corresponding fourth bit sequence of the second length according to a bit sequence of the first length corresponding to amplitude of second signal at the second band, where the second signal at the second band is obtained by delaying the first signal at the second band.

The ith look-up-table of the first to Nth look-up-tables is configured to obtain the ith table look-up address by combining a bit sequence of the second length corresponding to a signal at the first band and a bit sequence of the second length corresponding to a signal at the second band, and to look up the ith DPD coefficient according to the ith table look-up address, where $1 \leq i \leq N$.

The DPD coefficient combination module is configured to obtain a DPD coefficient by processing the first to Nth DPD coefficients.

The DPD processing unit 102 is configured to perform DPD processing on a signal at the first band according to the DPD coefficient obtained by the DPD coefficient processing module.

As N look-up addresses is obtained according to four address conversion tables in embodiments of the present disclosure, N DPD coefficients are obtained from look-up-tables according to the N look-up addresses, and a final DPD coefficient is obtained according to the N DPD coefficients to process a signal, thus providing a look-up address generation solution for a multi-band DPD system to realize multi-band DPD processing.

In embodiments of the present disclosure, the first band and the second band represent two different kinds of bands, respectively. For example, the first band is the F band and the second band is the A band; or the first band is the A band, and the second band is the F band. Embodiments of the present disclosure are not limited thereto.

Below are descriptions with an example that the first band is the F band, the second band is the A band.

Figure 2A:
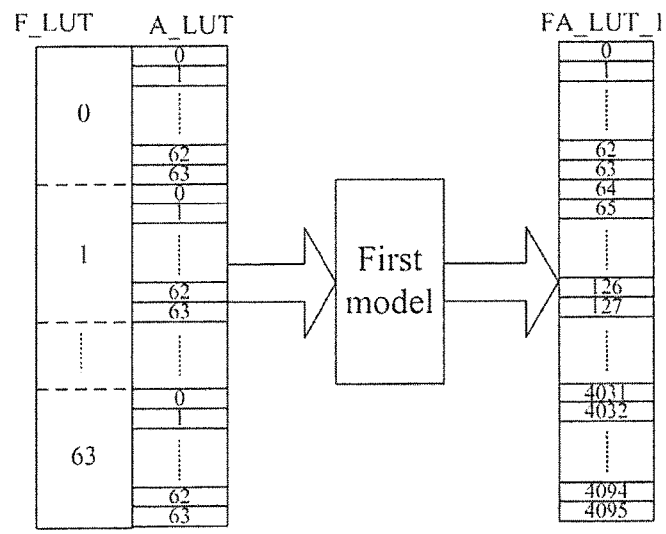
FIG. 2A and FIG. 2B are schematic diagrams of the construction of multi-band look-up-tables according to embodiments of the disclosure.
Figure 2B:
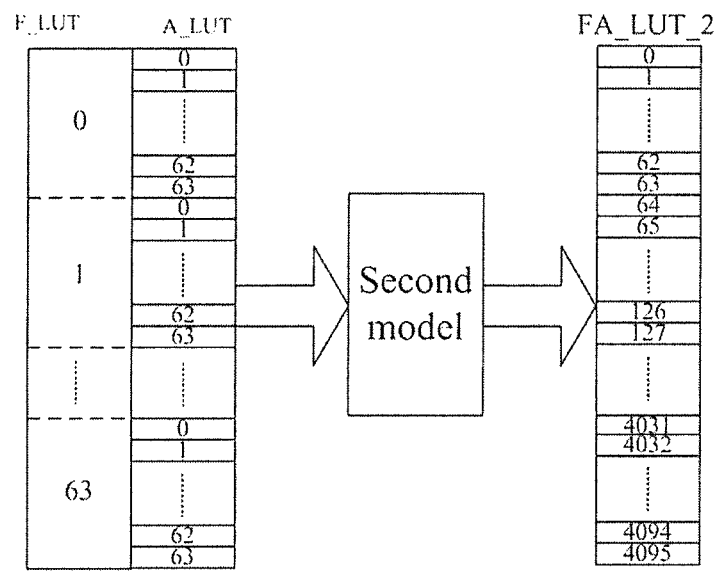

FIG. 2A and FIG. 2B are schematic diagrams of the construction of multi-band look-up-tables according to embodiments of the present disclosure.

According to embodiments of the present disclosure, the amplitude level of an F band signal and an A band signal over the entire dynamic range is 64. As illustrated in FIG. 2A and FIG. 2B, F_LUT represents the look-up-table of the F band, A_LUT represents the look-up-table of the A band; F_LUT is obtained by performing DPD training on an F band signal and A_LUT is obtained by performing DPD training on an A band signal. The amplitude level of the F band signal and the A band signal over the entire dynamic range is 64, so F_LUT and A_LUT both include 64 DPD coefficients. When the record length is 1, first model and second model are used to process the DPD coefficients in F_LUT and A_LUT respectively, to obtain FA_LUT_1 and FA_LUT_2, where the first model and the second model are both models without any cross terms.

As illustrated in FIG. 2A, according to the first model, calculations are made by using the DPD coefficients numbered 0 in A_LUT and the DPD coefficients numbered from 0 to 63 in F_LUT, respectively, to obtain the DPD coefficients numbered from 0 to 63 in FA_LUT_1, and then in a similarly way, the DPD coefficients numbered form 64 to 4095 in FA_LUT_1 could be obtained. Similarly, as illustrated in FIG. 2B, the DPD coefficients numbered from 0 to 4095 in FA_LUT_2 could also be obtained.

Specifically, the first model could be:

$$z_{1\_LUT}(n, m) = \sum_{k=0}^{Q} \sum_{j=0}^{k} c_{1,k,j,m,0} |y_{1\_LUT}(n_1)|^{k-j} |y_{2\_LUT}(n_2)|^{j} \quad (3)$$

$$\{0 \leq n_1 \leq 63, 0 \leq n_2 \leq 63, 0 \leq 4095, 0 \leq m \leq 2\}.$$

Q represents the maximum nonlinear order, $n = n_1 * 64 + n_2$; $z_{1\_LUT}(n,m)$ is the calculated result of the DPD coefficients in F_LUT and the DPD coefficients in A_LUT;

$|y_{1\_LUT}(n_1)|$ is the amplitude of a signal numbered $n_1$ in F_LUT; and $|y_{2\_LUT}(n_2)|$ is the amplitude of a signal numbered $n_2$ in A_LUT.

The second model could be:

$$z_{2\_LUT}(p, q) = \sum_{k=0}^{R}\sum_{j=0}^{k} c_{1,k,j,q,-1}|y_{1\_LUT}(n_3)|^{k-j}|y_{2\_LUT}(n_4)|^{j} \quad (4)$$

$$\{0 \leq n_3 \leq 63, 0 \leq n_4 \leq 63, 0 \leq 4095, 0 \leq q \leq 2\}.$$

R represents the maximum nonlinear order, $p=n_3*64+n_4$; $z_{2\_L}(p,q)$ is the calculated result of the DPD coefficients in F_LUT and the DPD coefficients in A_LUT; $|y_{1\_LUT}(n_3)|$ is the amplitude of a signal numbered $n_3$ in F_LUT; and $|y_{2\_LUT}(n_4)|$ is the amplitude of a signal numbered $n_4$ in A_LUT.

When the record length is 2, the first model, the second model, third model and fourth model are used respectively to process the DPD coefficients in A_LUT and F_LUT, to obtain FA_LUT_1, FA_LUT_2, FA_LUT_3, and FA_LUT_4, where the first model and the second model are both models without any cross terms, the third model and the fourth model are both models without any cross terms; and the processing principles are the same as the principle of how FA_LUT is obtained when the record length is 1, which would not be discussed herein any more.

In the same way, when the record length is 2, the first model, the second model, third model and fourth model are used respectively to process the DPD coefficients in A_LUT and F_LUT, to obtain AF_LUT_1, AF_LUT_2, AF_LUT_3, and AF_LUT_4.

The first to the fourth address conversion tables according to embodiments of the present disclosure could be four identical address conversion tables, where the amplitudes of the input signals of the first length of the first to the fourth address conversion tables each include 11 bits, the obtained corresponding first bit sequence, second bit sequence, third bit sequence and fourth bit sequence of the second length each include 6 bits, therefore, the length of each of the first to the Nth table look-up address is 12 bits, where each of the first to the Nth look-p address is obtained by combining two bit sequences of the first bit sequence, the second bit sequence, the third bit sequence and the fourth bit sequence, thus able to match the 4096 results in the first to the Nth look-up-tables.

The following describes how an input signal is converted to a 6-bit output through an address conversion table.

Since the bit sequence of the amplitude of each of the first signal at the first band, the second signal at the first band, the first signal at the second band and the second signal at the second band includes 15 bits, according to embodiments of the present disclosure, at first a bit truncation unit is used to truncate the bit sequences of the amplitudes of the first signal at the first band, the second signal at the first band, the first signal at the second band and the second signal at the second band, to obtain the bit sequences of the first length corresponding to the amplitudes of the first signal at the first band, the second signal at the first band, the first signal at the second band and the second signal at the second band.

Specifically, the bit truncation unit cuts off the highest bit and the lowest three bits in the bit sequence of the amplitude of each of the first signal at the first band, the second signal at the first band, the first signal at the second band and the second signal at the second band, to obtain the bit sequences of the first length corresponding to the amplitudes of the first signal at the first band, the second signal at the first band, the first signal at the second band and the second signal at the second band, where the bit sequences of the first length each include 11 bits.

Embodiments of the present disclosure employ a non-uniform quantization method.

Specifically, the range of values of the bit sequences of the first length is divided into first to Eth sub-ranges of an equal size, and the range of values of the bit sequences of the second length is divided into first to Eth sub-ranges of different sizes. The jth sub-range of the range of values of the bit sequences of the first length corresponds to the jth sub-range of the range of values of the bit sequences of the second length in a one-to-one match, and multiple bit sequences in the former (bit sequences of the first length) corresponds to one bit sequence in the latter (bit sequences of the second length), where E is an integer greater than 1 and $1 \leq j \leq E$.

Or, the range of values of the bit sequences of the first length is divided into first to Eth sub-ranges of different sizes, and the range of values of the bit sequences of the second length is divided into first to Eth sub-ranges of equal size. The jth sub-range of the range of values of the bit sequences of the first length corresponds to the jth sub-range of the range of values of the bit sequences of the second length in a one-to-one match, and multiple bit sequences in the former (bit sequences of the first length) corresponds to one bit sequence in the latter (bit sequences of the second length), where E is an integer greater than 1 and $1 \leq j \leq E$.

Moreover, for an intermediate frequency signal, the peak average rectified (PAR) of the signal is generally greater than 7 dBc, and the average is greater than 5000. The quantization is performed only through 6 bits, therefore, the quantization accuracies need to be differentiated. For some amplitude components of sensitive distribution, a more detailed distribution is employed, and for a general signal, a method of increasing the granularity of quantization accuracy is employed.

(1) For a small signal, as its amplitude is small, it would increase the quantization error if a distribution of large granularity is employed, the quantization accuracy of a small signal needs to be raised.

(2) A big signal is a main compressed part of a power amplifier, and thus the quantization of the big signal also needs to be more accurate, it is also needed to increase the quantization accuracy of a big signal.

(3) The quantization accuracies of a small signal and a big signal are increased; therefore, it is needed to increase the granularity of quantization of a signal near the average value.

Figure 3:
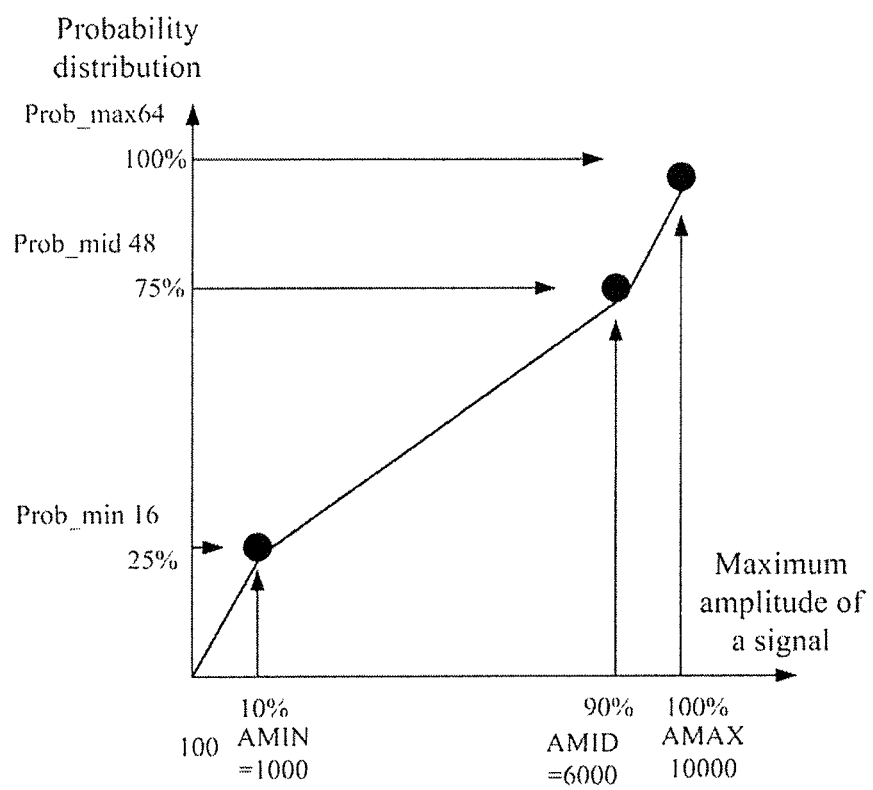
FIG. 3 is a schematic diagram of the amplitude principle design of non-uniform quantization according to embodiments of the disclosure.

According to "the principle of quantization refinement of small signal and big signal", 0.1% (a ratio of quantization amplitude) of the smallest signal takes up 25% of amplitude's distribution probability; 0.1% of the biggest signal takes up 25% of the amplitude's distribution probability and 80% of intermediate signal takes up 50% of the amplitude's distribution probability. According to this principle, if the length of a training sequence is 16348, the maximum amplitude of a signal (AMAX) equals 10000 (if it is bigger than 10000, it is also counted as 10000), if the maximum value of the intermediate signal is 6000, then the number of amplitudes distributed between 6000 and 10000 is 1638. 16 (25%) amplitude levels are set between 6000 and 10000. The maximum amplitude of the intermediate signal AMID equals 6000, the minimum amplitude of the intermediate signal AMIN equals 1000, then data of this level is set by 32 (50%) amplitude levels. 16 (25%) amplitude grades are set between 0 and 1000. FIG. 3 is a schematic diagram of the amplitude principle design of non-uniform quantization. The maximum amplitude of an input signal is related to the physical layer calibration and the signal's PAR.

For the abovementioned situation of a big signal, an intermediate signal and a small signal, E equals 3 in embodiments of the present disclosure; to realize non-uniform quantization, that is, to realize an effect that the quantization accuracies of the big signal and the small signal during compression process are high, while the quantization accuracy of the intermediate signal during compression process is low, embodiments of the present disclosure could adopt the following two methods.

Method 1.

The range of values of a bit sequence of the first length is divided into first to third sub-ranges of an equal size, and the range of values of a bit sequence of the second length is divided into first to third sub-ranges of different sizes, where the second sub-range has the smallest size.

Method 2.

The range of values of a bit sequence of the first length is divided into first to third sub-ranges of different sizes, while the range of values of a bit sequence of the second length is divided into first to third sub-ranges of an equal size, where the second sub-range has the biggest size. Abovementioned methods for division according to embodiments of the present disclosure are all exemplary methods, and all methods for division could be employed that are able to realize the effect that the quantization accuracies of the big signal and the small signal during compression process are high and the quantization accuracy of the intermediate signal during compression process is low; for example, it is also possible to use a method for non-uniform division, that is, the range of values of a bit sequence of the first length and the range of values of a bit sequence of the second length could both be divided in a non-uniform manner, and the amplitude of the intermediate signal of a larger range is made to correspond to the value of the bit sequence of the second length of a smaller range during the division process; on which embodiments of the present disclosure do not limit.

This non-uniform quantization according to embodiments of the present disclosure is especially suitable for multi-band DPD system, where by using this kind of non-uniform quantization apparatus, the features of a power amplifier can be better reflected, and the test performance of DPD can be effectively improved comparing to the case of uniform quantized ACPR (Adjacent Channel Power Ratio).

Figure 4A:
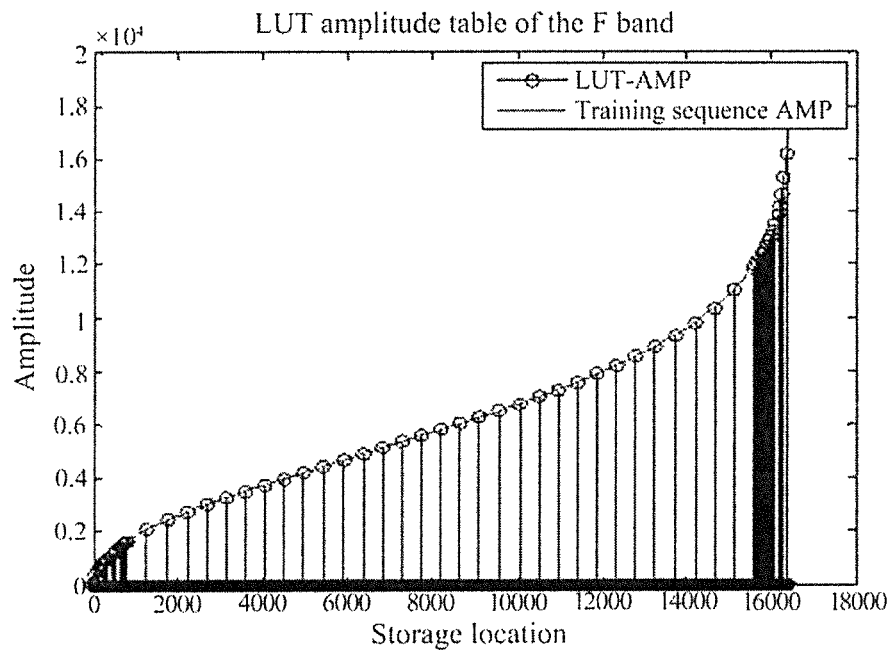
FIG. 4A and FIG. 4B are schematic diagrams of storage locations corresponding to amplitudes of inputs at the F band and the A band according to some embodiments of the disclosure.
Figure 4B:
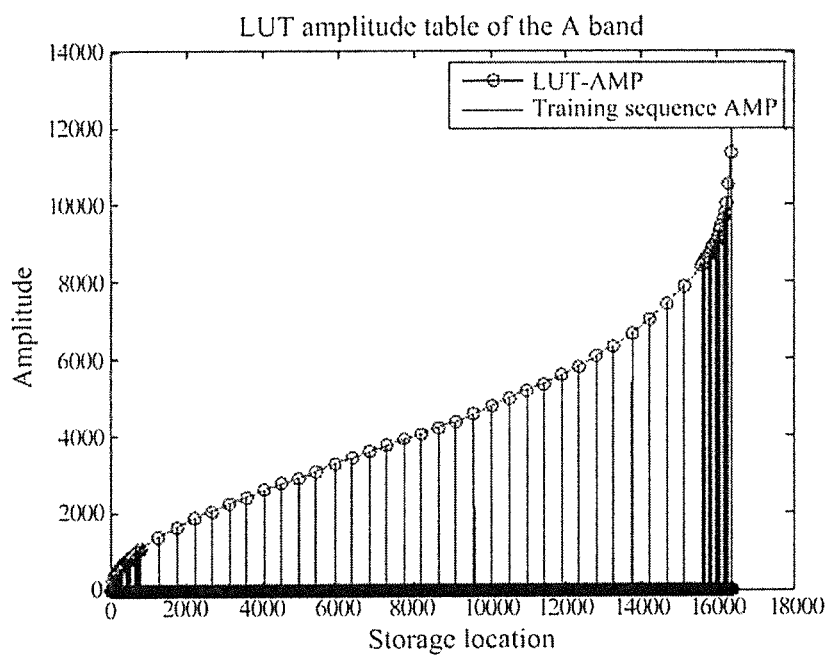

FIG. 4A and FIG. 4B are schematic diagrams of the locations where the amplitudes of inputs at the F band and the A band are stored. It can be seen from FIG. 4A and FIG. 4B that every 52 amplitudes of a small signal correspond to an amplitude level table, every 461 amplitudes of an intermediate signal correspond to an amplitude level table and every 54 amplitudes of a big signal correspond to an amplitude level table. Therefore, when 16384 signals are input, the outputs of corresponding amplitude level table are 64. For amplitude of every input signal, the closest amplitude in the amplitude level table is found to obtain its index n1/n2:0~63.

Processing method of an address conversion table is introduced below.

Figure 5:
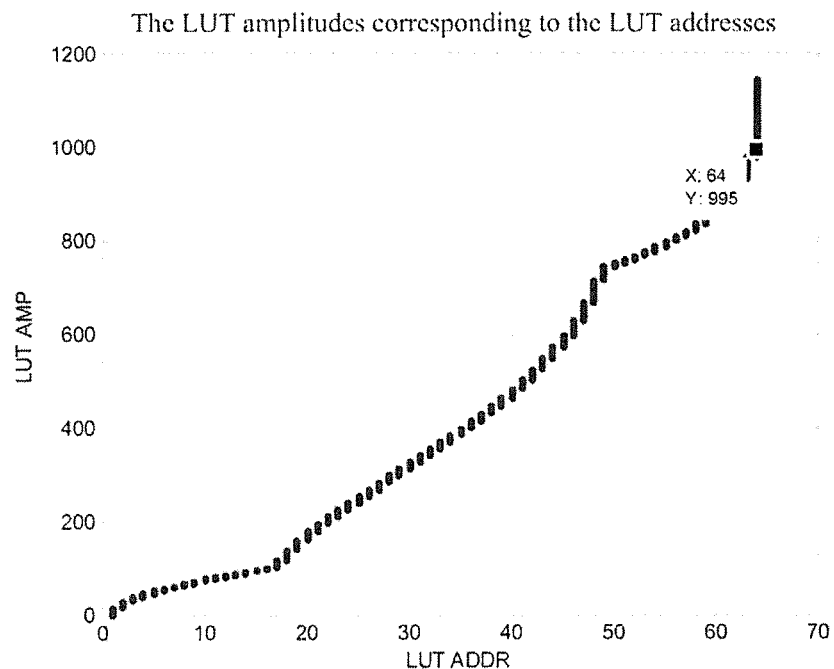
FIG. 5 is a schematic diagram of corresponding relationships between LUT AMPs (0~2046) and LUT addresses (0~64) of the F band according to embodiments of the disclosure.

Compare amplitudes of a training sequence (the maximum amplitude of the training sequence includes 15 bits, and after 3 bits have been cut off, the maximum amplitude is not bigger than 2048) with values of 64 amplitude level tables, where the values of the 64 amplitude level tables are used for comparison in turn to find the closest value and obtain its index. FIG. 5 is the schematic diagram of corresponding relationships between LUT AMPs (0~2048) and LUT addresses (0~64) of the F band, where AMP stands for amplitude. An LUT AMP is obtained by cutting off the lowest 3 bits of an input signal at the F band, and thus the maximum LUT AMP is 995. Then by default LUT AMPs whose values are between 995 and 2048 choose the LUT address equal to 64, corresponding to the maximum output, 64, of the LUT addresses, that is, 6 bits are output. Similarly, an LUT AMP is obtained by cutting off the lowest 3 bits of an input signal at the A band, and the maximum LUT AMP, 685, corresponds to 64. Then by default LUT AMPs whose values are between 685 and 2048 choose the LUT address equal to 64, corresponding to the maximum output, 64, of the LUT addresses, that is, 6 bits are output.

Figure 6:
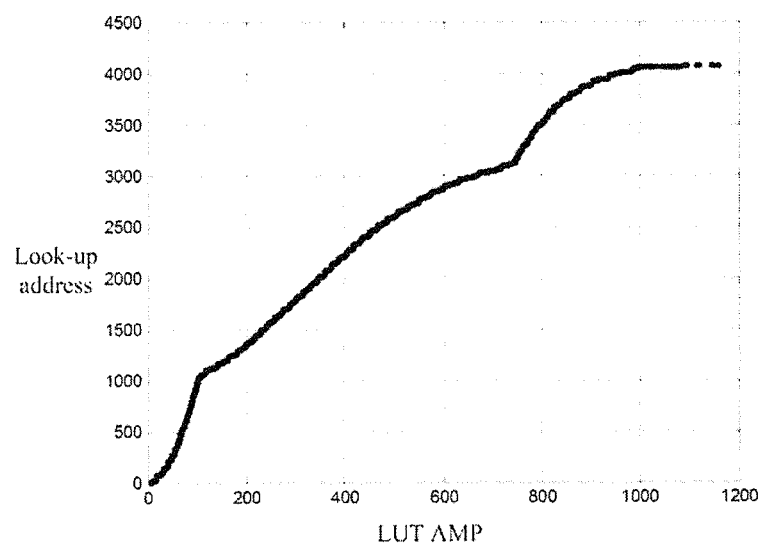
FIG. 6 is a schematic diagram of look-up addresses obtained according to outputs of address conversion tables according to embodiments of the disclosure.

After the abovementioned processing, a 6-bit output corresponding to the amplitude of an input signal at the F band and a 6-bit output corresponding to the amplitude of an input signal at the A band are obtained. FIG. 6 is the schematic diagram of look-up addresses obtained according to the outputs of address conversion tables, where the output 6 bits corresponding to the amplitude of an input signal at the F band is combined with the output 6 bits corresponding to the amplitude of an input signal at the A band to obtain a 12-bit output, that is, 0~4096.

If the resources are enough, a delay described below is adopted and the predistortion architecture of a signal at the F band is:

$$y_1(n) = \sum_{m_1=0}^{M-1} \sum_{k=0}^{Q} \sum_{j=0}^{k} \sum_{l=-1}^{0} c_{k,j,m_1,l} x_1(n-m_1) |x_1(n-m_1)|^{k-j} |x_2(n-m_1+l)|^j \quad (5)$$

$$= \sum_{m_1=0}^{M-1} x_1(n-m_1) \left\{ \begin{array}{l} \sum_{k=0}^{Q} \sum_{j=1}^{k} c_{k,j,m_1,-1} |x_1(n-m_1)|^{k-j} |x_1(n-m_1-1)|^j + \\ \sum_{k=0}^{Q} \sum_{j=0}^{k} c_{k,j,m_1,0} x_1(n-m_1) |x_1(n-m_1)|^{k-j} |x_2(n-m_1)|^j \end{array} \right\}$$

$$= \sum_{m=0}^{M-1} x_1(n-m_1) \cdot \left\{ \begin{array}{l} LUT_{FM}(|x_1(n-m)|, |x_2(n-m)|) + \\ LUT_{FMN}(|x_1(n-m)|, |x_2(n-m-1)|) \end{array} \right\}.$$

M is the record length, k is a non-linear factor, l is a time cross term, L is the maximum time cross term in the channel, Q is the non-linear order, $x_1$ is the input signal of first channel, $y_1(n)$ is the output signal of the first channel, c is a predistortion parameter and n is sampling time.

If the resources are enough, a delay described below is adopted and the predistortion architecture of a signal at the A band is:

$$y_2(n) = \sum_{m_1=0}^{M-1} \sum_{k=0}^{Q} \sum_{j=0}^{k} \sum_{l=-1}^{0} c_{k,j,m_1,l} x_2(n-m_1)|x_2(n-m_1)|^{k-j}|x_1(n-m_1+l)|^j \quad (6)$$

$$= \sum_{m_1=0}^{M-1} x_2(n-m_1) \left\{ \begin{array}{l} \sum_{k=0}^{Q} \sum_{j=1}^{k} c_{k,j,m_1,-1}|x_2(n-m_1)|^{k-j}|x_1(n-m_1-1)|^j + \\ \sum_{k=0}^{Q} \sum_{j=0}^{k} c_{k,j,m_1,0} x_2(n-m_1)|x_2(n-m_1)|^{k-j}|x_1(n-m_1)|^j \end{array} \right\}$$

$$= \sum_{m=0}^{M-1} x_2(n-m_1) \cdot \left\{ \begin{array}{l} LUT_{FM}(|x_2(n-m)|, |x_1(n-m)|) + \\ LUT_{FMP}(|x_2(n-m)|, |x_1(n-m+1)|) \end{array} \right\}.$$

M is the record length, k is a non-linear factor, l is a time cross term, L is the maximum time cross term in the channel, Q is the non-linear order, $x_2$ is the input signal of second channel, $y_2(n)$ is the output signal of the second channel, c is a predistortion parameter and n is sampling time.

To explain the present disclosure more clearly, cases where the dual-band record lengths are 1 and 2, respectively, are introduced below.

Figure 7:
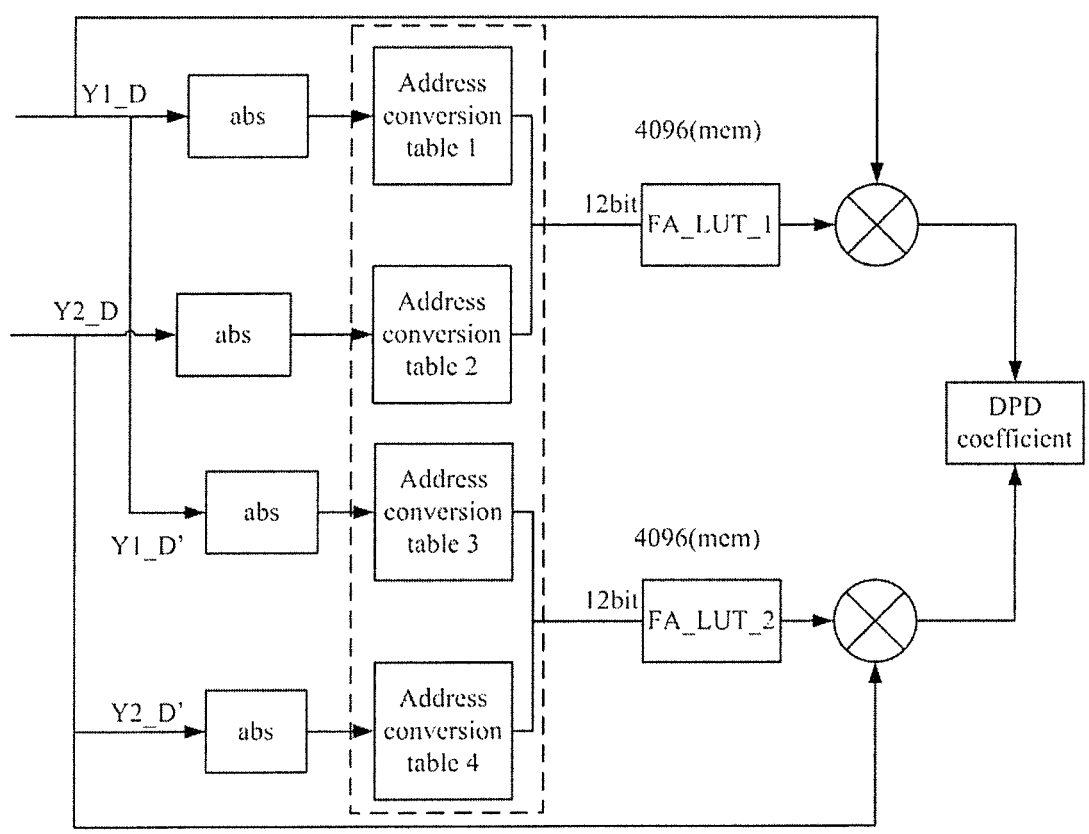
FIG. 7 is a schematic diagram of the architecture of DPD processing when record lengths of the F band and the A band are 1 according to embodiments of the disclosure.

(1) In the case where the record length is 1, processing on dual-band DPD (without cross term): FIG. 7 is a schematic diagram of the architecture of DPD processing when the record lengths of the F band and the A band are 1, where the architecture includes 4 address conversion tables, i.e. address conversion table 1, address conversion table 2, address conversion table 3 and address conversion table 4; 2 look-up-tables, i.e. FA_LUT_1 and FA_LUT_2, where FA_LUT_1 is obtained by processing DPD coefficients in F_LUT and A_LUT based on the first model and FA_LUT_2 is obtained by processing DPD coefficients in F_LUT and A_LUT based on the second model.

With this architecture, now introduce the processing with the F band as an example and the processing of the A band is similar to the processing of the F band.

As illustrated in FIG. 7, Y1_D represents an F band signal, and Y1_D' is a signal after delay processing has been performed on Y1_D; Y2_D represents an A band signal, and Y2_D' is a signal after delay processing has been performed on Y2_D.

Obtaining an 11-bit amplitude from Y1_D, looking up in the address conversion table 1 according to the 11-bit amplitude to obtain a 6-bit sequence, and using the 6-bit sequence as the highest 6 bits of the look-up address of F_LUT_1.

Obtaining an 11-bit amplitude from Y2_D, looking up in the address conversion table 1 according to the 11-bit amplitude to obtain a 6-bit sequence, and using the 6-bit sequence as the lowest 6 bits of the look-up address of F_LUT1.

In an order of bits from high to low, the look-up address of the FA_LUT1 includes a first bit sequence and a second bit sequence.

Similarly, obtaining an 11-bit amplitude from Y1_D, looking up in the address conversion table 1 according to the 11-bit amplitude to obtain a 6-bit sequence, and using the 6-bit sequence as the highest 6 bits of the look-up address of A_LUT_1.

Obtaining an 11-bit amplitude from Y2_D, looking up in the address conversion table 1 according to the 11-bit amplitude to obtain a 6-bit sequence, and using the 6-bit sequence as the lowest 6 bits of the look-up address of A_LUT1.

In an order of bits from high to low, the look-up address of the FA_LUT2 includes a first bit sequence and a second bit sequence.

According to the look-up addresses of FA_LUT1 and FA_LUT2, looking up in FA_LUT1 and FA_LUT2 respectively, obtaining two DPD coefficients, and processing the two DPD coefficients to obtain a DPD coefficient for DPD processing on an F band signal.

(2) When the record length is 2, the processing on the dual-band DPD (with cross-term) is as follow.

Figure 8:
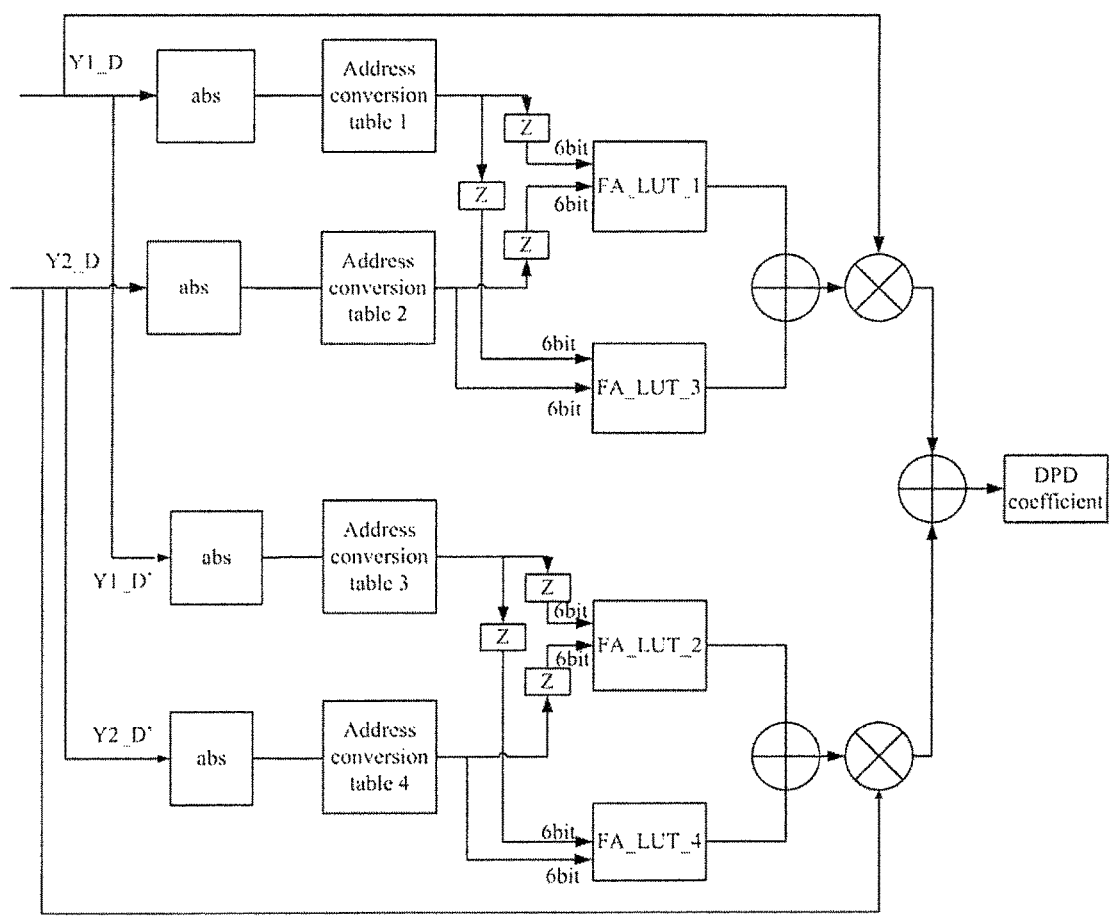
FIG. 8 is a schematic diagram of the architecture of DPD processing when record lengths of the F band and the A band are 2 according to embodiments of the disclosure.

FIG. 8 is a schematic diagram of the architecture of DPD processing when the record lengths of the F band and the A band are 2, where the architecture illustrates the DPD processing of the F band when the record length of the F band and the A band are 2, the cross term A's channel is 1-taps in advance.

As illustrated in FIG. 8, the architecture includes 4 address conversion tables, i.e. address conversion table 1, address conversion table 2, address conversion table 3 and address conversion table 4; 4 look-up-tables, i.e. FA_LUT_1, FA_LUT_2, FA_LUT_3 and FA_LUT_4, where FA_LUT_1 and FA_LUT_2 are record term look-up-tables of the F band, FA_LUT_3 and FA_LUT_4 are cross term look-up-tables of the F band. FA_LUT_1 is obtained by processing DPD coefficients in F_LUT and A_LUT based on the first model; FA_LUT_2 is obtained by processing DPD coefficients in F_LUT and A_LUT based on the second model; FA_LUT_3 is obtained by processing DPD coefficients in F_LUT and A_LUT based on the third model; FA_LUT_4 is obtained by processing DPD coefficients in F_LUT and A_LUT based on the fourth model.

According to embodiments of the present disclosure, the number of look-up-tables is N, N=2*M, where M is the record length.

With this architecture, now introduce the processing with the F band as an example and the processing of the A band is similar to the processing of the F band.

As illustrated in FIG. 8, Y1_D represents an F band signal, and Y1_D' is a signal after delay processing has been performed on Y1_D; Y2_D represents an A band signal, and Y2_D' is a signal after delay processing has been performed on Y2_D.

Obtaining an 11-bit amplitude from Y1_D, looking up in the address conversion table 1 according to the 11-bit amplitude to obtain a 6-bit sequence, performing delay processing on the 6-bit sequence once, and using a resulted sequence as the highest 6 bits of the look-up address of FA_LUT_1.

Obtaining an 11-bit amplitude from Y2_D, looking up in the address conversion table 1 according to the 11-bit amplitude to obtain a 6-bit sequence, performing delay processing on the 6-bit sequence once, and using a resulted sequence as the lowest 6 bits of the look-up address of FA_LUT_1.

Combining the abovementioned highest 6 bits and the lowest 6 bits to obtain a 12-bit address as the look up address of FA_LUT_1.

Obtaining an 11-bit amplitude from Y1_D, looking up in the address conversion table 1 according to the 11-bit amplitude to obtain a 6-bit sequence, performing delay processing on the 6-bit sequence once, and using a resulted sequence as the highest 6 bits of the look-up address of FA_LUT_3.

Obtaining an 11-bit amplitude from Y2_D, looking up in the address conversion table 1 according to the 11-bit amplitude to obtain a 6-bit sequence, and using a resulted sequence as the lowest 6 bits of the look-up address of FA_LUT_3.

Combining the abovementioned highest 6 bits and the lowest 6 bits to obtain a 12-bit address as the look up address of FA_LUT_3.

Similarly, obtaining an 11-bit amplitude from Y1_D', looking up in the address conversion table 1 according to the 11-bit amplitude to obtain a 6-bit sequence, performing delay processing on the 6-bit sequence once, and using a resulted sequence as the highest 6 bits of the look-up address of FA_LUT_2.

Obtaining an 11-bit amplitude from Y2_D', looking up in the address conversion table 1 according to the 11-bit amplitude to obtain a 6-bit sequence, performing delay processing on the 6-bit sequence once, and using a resulted sequence as the lowest 6 bits of the look-up address of FA_LUT_2.

Combining the abovementioned highest 6 bits and the lowest 6 bits to obtain a 12-bit address as the look up address of FA_LUT_2.

Obtaining an 11-bit amplitude from Y1_D', looking up in the address conversion table 1 according to the 11-bit amplitude to obtain a 6-bit sequence, performing delay processing on the 6-bit sequence once, and using a resulted sequence as the highest 6 bits of the look-up address of FA_LUT_4.

Obtaining an 11-bit amplitude from Y2_D', looking up in the address conversion table 1 according to the 11-bit amplitude to obtain a 6-bit sequence, and using a resulted sequence as the lowest 6 bits of the look-up address of FA_LUT_4.

Combining the abovementioned highest 6 bits and the lowest 6 bits to obtain a 12-bit address as the look up address of FA_LUT_4.

According to the look-up addresses of FA_LUT_1, FA_LUT_2, FA_LUT_3, and FA_LUT_4, look up in FA_LUT_1, FA_LUT_2, FA_LUT_3, and FA_LUT_4 respectively, obtain four DPD coefficients, and process the four DPD coefficients to obtain a DPD coefficient for DPD processing on an F band signal. Preferably, to make the structure of the DPD system in FIG. 1 according to embodiments of the present disclosure not only applicable to multi-band DPD processing, but also to single-band DPD processing, a first switch and a second switch are set at the input ends of first band signals and second band signals of the table look-up unit, respectively.

Figure 9:
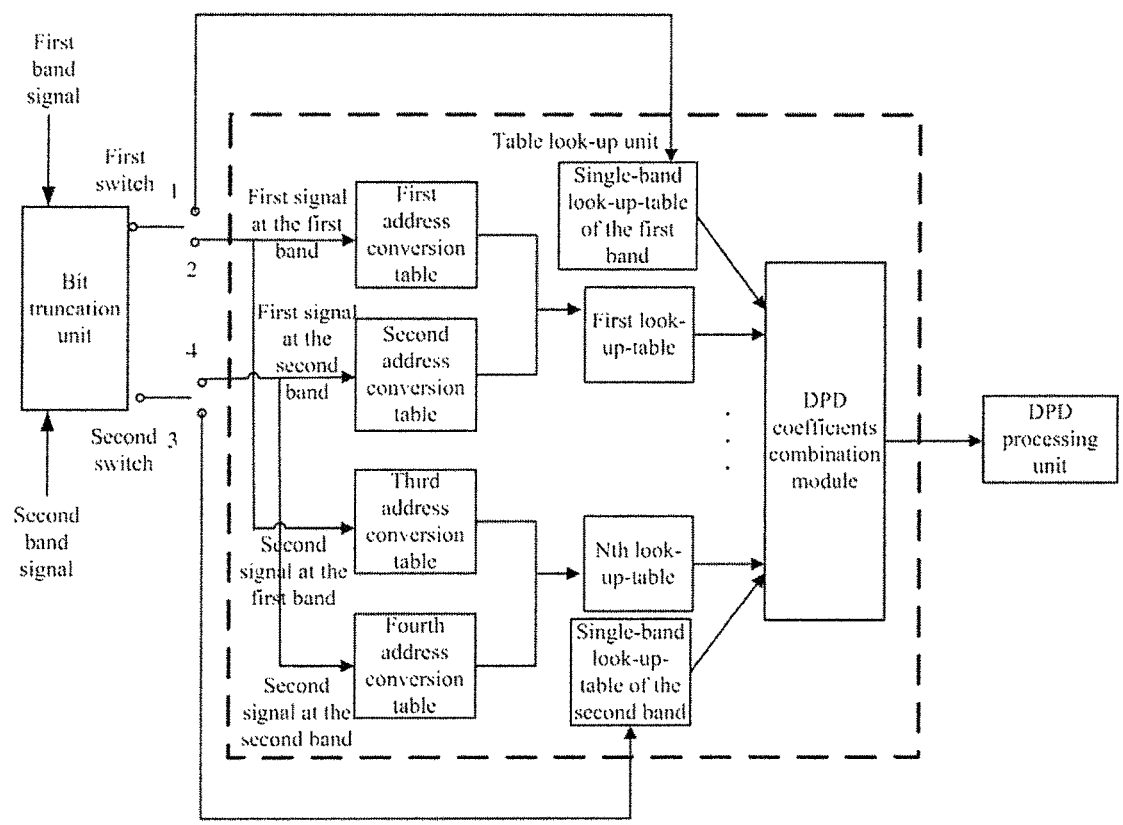
FIG. 9 is a schematic diagram of the structure of another DPD system according to embodiments of the disclosure.

FIG. 9 is another schematic diagram of the structure of another DPD system according to embodiments of the present disclosure. The first switch selectively connects with contact 1 and contact 2, and the second switch selectively connects with contact 3 and contact 4. When the first switch connects with the contact 1, the first band signals are input into a single-band look-up-table of the first band; when the first switch connects with the contact 2, the first band signals are input into the first address conversion table and the second address conversion table; when the second switch connects with the contact 3, the second band signals are input into a single-band look-up-table of the second band, and when the second switch connects with the contact 4, the second band signals are input into the third address conversion table and the fourth address conversion table.

Specifically, if a signal to be processed is a single-band signal, then the first switch is connected with the contact 1 and the second switch is connected with the contact 3, so that in a case of a single-band signal, processing by address conversion tables is unnecessary, and a DPD coefficient is obtained by look up in the single-band look-up table of the first band or the single-band look-up-table of the second band according to the amplitude of the signal, thus completing the DPD processing. If a signal to be processed is a multi-band signal, then the first switch is connected with the contact 2 and the second switch is connected with the contact 4, so that in a case of a multi-band signal, processing by address conversion tables is necessary, and after corresponding look-up addresses have been generated, a DPD coefficient is obtained according to the look-up address, thus completing the DPD processing. With the solution described according to embodiment of the present invention, the addition of another level of cross-term of the 2D-DPD requires only the addition of another level in a LUT, which does not require the addition of the multiplier, and greatly reduces the number of multipliers. To add another level of cross term, it is only needed to add another level in a LUT, without adding any address conversion tables, thus laying foundation for flexible expansion of the 2D-DPD.

It can be seen from the descriptions above that the DPD system according to the embodiments of the present disclosure includes a table look-up unit and a DPD processing unit, where the table look-up unit includes first to fourth address conversion tables, first to Nth look-up-tables and a DPD coefficient combination module, where N=2M and M is record length. The first to the fourth address conversion tables obtain bit sequences of fewer bits according to bit sequences corresponding to amplitudes of signals at different bands, respectively; each of the first to the Nth look-up-tables obtains one of the first to Nth table look-up addresses by combining two bit sequences of the bit sequences obtained according to the first to the fourth address conversion tables, and looks up one of first to Nth DPD coefficients according to one of the first to the Nth table look-up addresses; the DPD coefficient combination module processes the first to the Nth DPD coefficients to obtain a DPD coefficient, so that the DPD processing unit could perform DPD processing on first band signals according to the DPD coefficient obtained by the DPD coefficient processing module. As according to the embodiments of the present disclosure, N look-up addresses are obtained according to four address conversion tables, then N DPD coefficients in look-up-tables are obtained according to the N look-up addresses and a final DPD coefficients is obtained according to the N DPD coefficients to process signals, therefore a look-up address generation solution is provided for a multi-band DPD system to realize multi-band DPD processing.

Those skilled in the art should understand, the embodiments of the present disclosure could be provided as a method, a system or a computer program product. Therefore, the disclosure could adopt the forms of a complete hardware embodiment, a complete software embodiment or an embodiment combining both software and hardware. Moreover, the present disclosure could take the form of a computer program product which could be implemented on one or more computer usable storage media (including but not limited to disk storage, a CD-ROM, or an optical memory, etc.) including computer executable instructions.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the embodiments of the disclosure have been described, those skilled in the art benefiting from the underlying inventive concept can make additional modifications and variations to these embodiments. Therefore the appended claims are intended to be construed as encompassing the embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A digital predistortion DPD system, the system comprises: a table lookup unit and a DPD processor, wherein the table look-up unit comprises first to fourth address conversion tables, first to Nth look-up-tables and a DPD coefficient combination processor; wherein the first to Nth look-up tables are multi-band look-up tables, N=2M, M is record length and a positive integer;

the first address conversion table is configured to obtain a corresponding first bit sequence of second length according to a bit sequence of first length corresponding to amplitude of first signal at first band, wherein the first length is longer than the second length; the second address conversion table is configured to obtain a corresponding second bit sequence of the second length according to a bit sequence of the first length corresponding to amplitude of first signal at second band;

the third address conversion table is configured to obtain a corresponding third bit sequence of the second length according to a bit sequence of the first length corresponding to amplitude of second signal at the first band, wherein the second signal at the first band is obtained by delaying the first signal at the first band;

the fourth address conversion table is configured to obtain a corresponding fourth bit sequence of the second length according to a bit sequence of the first length corresponding to amplitude of second signal at the second band, wherein the second signal at the second band is obtained by delaying the first signal at the second band;

the ith look-up-table of the first to Nth look-up-tables, is configured to obtain an ith table look-up address by combining a bit sequence of the second length corresponding to a signal at the first band and a bit sequence of second length corresponding to a signal at the second band, and to look up an ith DPD coefficient according to the ith table look-up address, wherein 1<i<N;

the DPD coefficient combination processor is configured to obtain a DPD coefficient by combining the first to the Nth DPD coefficients; and the DPD processor is configured to perform DPD processing on signals at the first frequency using the DPD coefficient obtained by the DPD coefficient combination processor.

2. The DPD system according to claim 1, wherein M=1;

the first look-up-table is configured to look up a first DPD coefficient according to a first table look-up address constituted by the first bit sequence and the second bit sequence, wherein in an order of bits from high to low, the first table look-up address comprises the first bit sequence and the second bit sequence; and the second look-up-table is configured to look up a second DPD coefficient according to a second table look-up address constituted by the third bit sequence and the fourth bit sequence; wherein in an order of bits from high to low, the second table look-up address comprises the third bit sequence and the fourth bit sequence.

3. The DPD system according to claim 1, wherein M=2;

the first look-up-table is configured to look up a first DPD coefficient according to a first table look-up address constituted by the first bit sequence and the second bit sequence, wherein in an order of bits from high to low, the first table look-up address comprises the first bit sequence and the second bit sequence;

the second table look-up-table is configured to look up a second DPD coefficient according to a second table look-up address constituted by the first bit sequence and the second bit sequence, wherein in an order of bits from high to low, the second look-up address comprises the first bit sequence and the second bit sequence;

the third look-up-table is configured to look up a third DPD coefficient according to a third table look-up address constituted by the third bit sequence and the fourth bit sequence, wherein in an order of bits from high to low, the third table look-up address comprises the third bit sequence and the fourth bit sequence; and the fourth look-up-table is configured to look up a fourth DPD coefficient according to a fourth table look-up address constituted by the third bit sequence and the fourth bit sequence, wherein in an order of bits from high to low, the fourth table look-up address comprises the third bit sequence and the fourth bit sequence.

4. The DPD system according to claim 1, wherein the DPD system further comprises
a bit truncate unit, where the bit truncate unit is configured to:
truncate bit sequences of the amplitudes of the first signal at the first band, the second signal at the first band, the first signal at the second band and the second signal at the second band, to obtain bit sequences of the first length corresponding to the amplitudes of the first signal of the first band, the second signal of the first band, the first signal of the second band and the second signal of the second band.

5. The DPD system according to claim 4, wherein the bit truncate unit is configured to:
cut off one highest bit and three lowest bits in the bit sequence of amplitude of each of the first signal at the first band, the second signal at the first band, the first signal at the second band and the second signal at the second band, to obtain bit sequences of the first length corresponding to the amplitudes of the first signal of the first band, the second signal of the first band, the first signal of the second band and the second signal of the second band, wherein a bit sequence of the first length comprises 11 bits.

6. The DPD system according to claim 1, wherein a first switch and a second switch are respectively set at an input end of first band signals and an input end of second band signals of the table look-up unit, wherein the first switch selectively connects with a first contact and a second contact, and the second switch selectively connects with a third contact and a fourth contact;
when the first switch connects with the first contact, the first band signals are input into a single-band look-up-table of the first band; and when the first switch connects with the second contact, the first band signals are input into the first address conversion table and the second address conversion table; and
when the second switch connects with the third contact, the second band signals are input into a signal-band look-up-table of the second band; and when the second switch connects with the fourth contact, the second band signals are input into the third address conversion table and the fourth address conversion table.

7. The DPD system according to claim 6, further comprises a control module, wherein the control module is configured to:
if the input signal is determined to be a single-band signal at the first band, control the first switch to connect with the first contact;
if the input signal is determined to be a second-hand signal at the second band, control the second switch to connect with the third contact; and if the input signal is determined to be a multi-band signal, control the first switch to connect with the second contact and the second switch to connect with the fourth contact.

8. The DPD system according to claim 1, wherein
the first to the fourth address conversion tables each comprise a corresponding relationship between a bit sequence of the first length and a bit sequence of the second length, where,
a range of values of the bit sequence of the first length is divided into first to Eth subranges of an equal size, a range of values of the bit sequence of the second length is divided into first to Eth sub-ranges of different sizes; and a jth sub-range of the range of values of the bit sequence of the first length is corresponding to a jth sub-range of the range of values of the bit sequence of the second length in a one-to-one match, wherein multiple bit sequences in the bit sequences of the first length correspond to one bit sequence in the bit sequences of the second length, E is an integer greater than 1 and $1 < j \leq E$; or
a range of values of the bit sequence of the first length is divided into first to Eth subranges of different sizes, a range of values of the bit sequence of the second length is divided into first to Eth sub-ranges of an equal size; and a jth sub-range of the range of values of the bit sequence of the first length is corresponding to a jth sub-range of the range of values of the bit sequence of the second length in a one-to-one match, wherein multiple bit sequences in the bit sequences of the first length correspond to one bit sequence in the bit sequences of the second length, E is an integer greater than 1 and $1 < j \leq E$.

9. The DPD system according to claim 8, wherein $E=3$;
if the range of values of a bit sequence of the second length is divided into first to third sub-ranges of an equal size in an order of the bit sequence's value from small to large, a second sub-range is the smallest; and
if the range of values of a bit sequence of the first length is divided into first to third subranges in an order of the bit sequence's value from small to large, the second sub-range is the largest.

10. The DPD system according to claim 1, wherein each of the first to the Nth look-up-tables comprises 64×64 DPD coefficients at most, wherein the second length is 6 bits and each of the first to the Nth table look-up addresses obtained after combination comprises 12 bits.

11. The DPD system according to claim 1, wherein the first band is the F band, and the second band is the A band; or the first band is the A band and the second band is the F band.

* * * * *